Patented Apr. 17, 1934

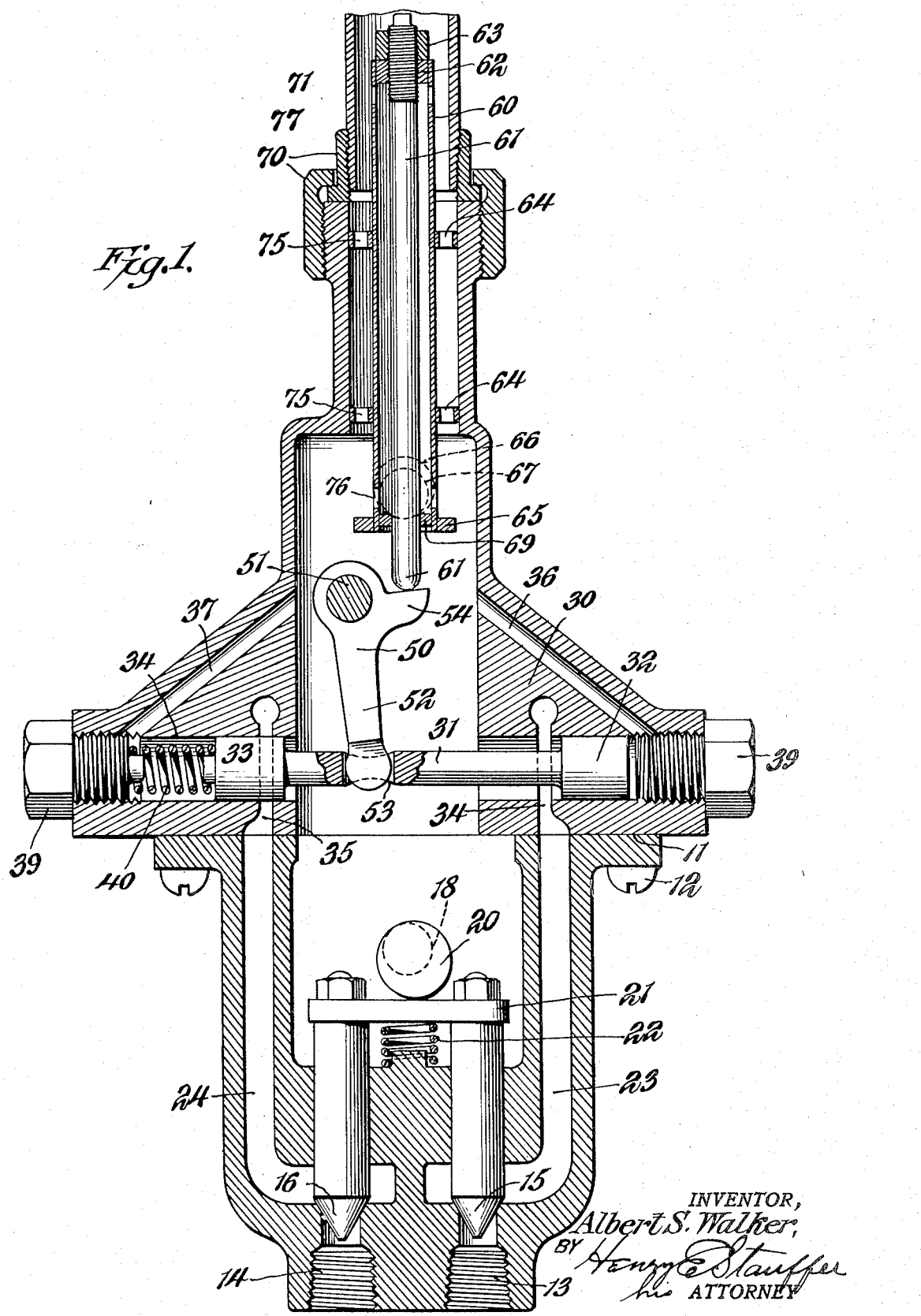

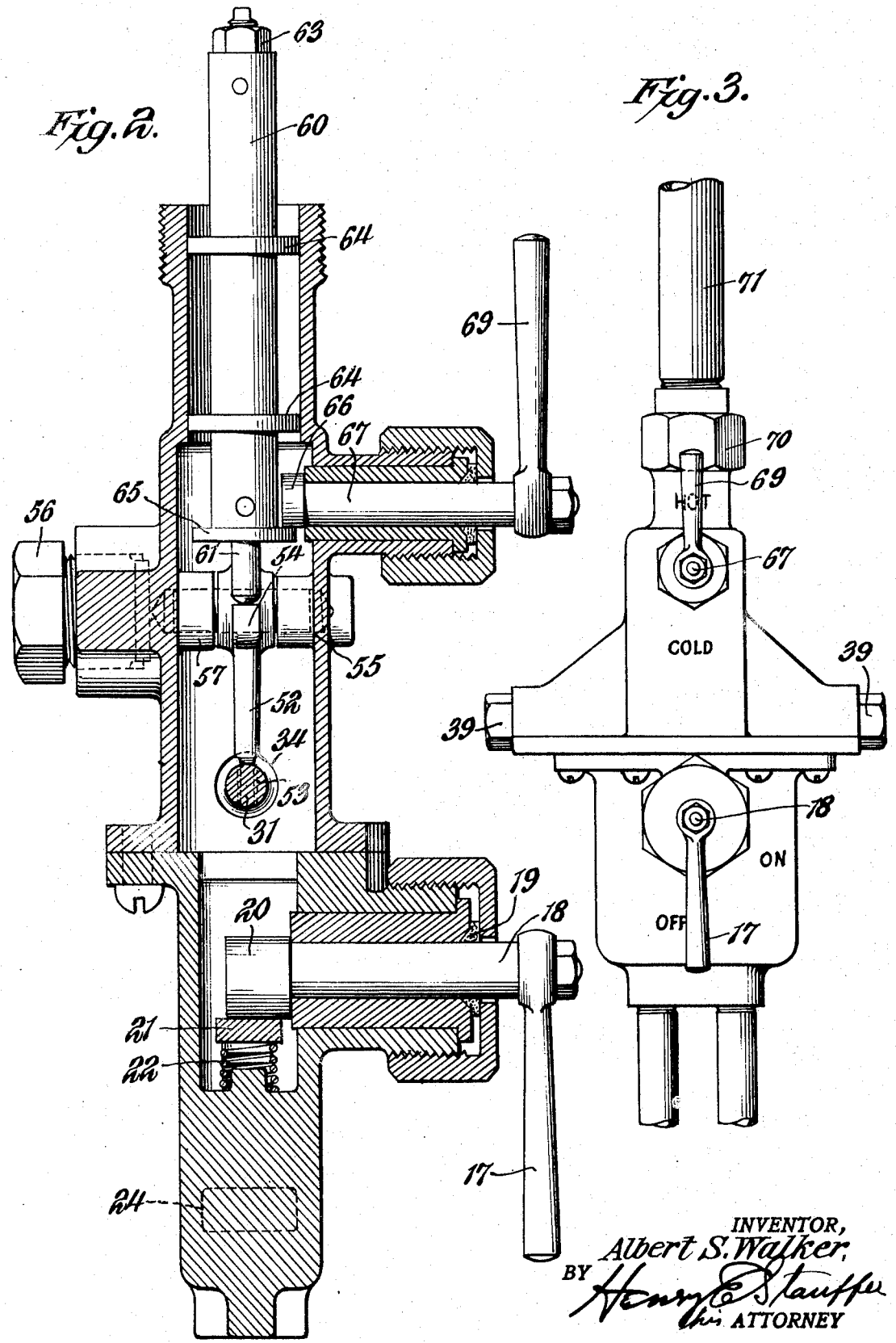

1,954,903

UNITED STATES PATENT OFFICE 1,954,903

THERMOSTATIC MIXING VALVE

Albert S. Walker, Yorba Linda, Calif.

Application October 7, 1932, Serial No. 636,739

2 Claims. (Cl. 236—12)

The invention relates more particularly to valves for mixing hot and cold water or other liquids so as to obtain a resultant mixture of the desired temperature. While such valves have many uses, they are particularly adapted to control the temperature of water for bathing purposes, and especially for shower baths.

The object of this invention is to so mix the water coming from hot and cold sources of supply that water of the desired temperature may be secured and maintained as long as the water continues to flow.

The principal object of the invention therefore is to control the supply of both hot and cold water by the temperature of the water itself. With this object in view, the heat responsive or thermostatic element is placed in the path of the water itself after the mixing has taken place. Two valves are used, one to control the supply of hot water, and the other to control the supply of cold water; and the thermostatic element is so connected with these valves that variations in the temperature of the water, and therefore of the thermostat, will bring about a movement of the valves so as to vary the amount of hot and cold water in the proportions needed.

Another object of the invention is to provide a construction in which the user may manually vary the position of the thermostat, and thus vary the temperature at which the thermostat shall become effective to control the water supply.

Other objects of the invention will more fully appear in the specification which follows.

In the drawings:

Fig. 1 is a vertical section through the structure.

Fig. 2 is a section taken at right angles to that of Fig. 1, and shows both the means for controlling the water supply and means for effecting manual adjustment of the thermostatic elements.

Fig. 3 is a front view of the valve illustrating the manual controlling device by which the thermostat may govern the flow of water at varying temperatures.

Referring to the drawings, and particularly to Figs. 1 and 2 thereof, the casing of the valve is represented as made in two parts; a lower part 10 and an upper part 30. These are connected at the point 11 by screws or bolts 12. But while the casing is thus shown as made in two parts, this is not of the essence of the invention, and the same may be constructed in any convenient way.

Opening into the lower chamber 10 are two channels 13 and 14, one connected with the supply of hot water and the other with the supply of cold water. It is not material just what this connection is, but for purpose of illustration it has been assumed that 13 represents hot water connection and 14 the cold water connection.

For the purpose of controlling the supply of water to the lower chamber 10 two valves operable by a single manual device are used. These valves may be of any suitable kind, but as here illustrated they are the conical type, resting upon appropriate seats, the valve 15 serving to control the hot water supply, and the valve 16 serving to control the cold water supply. These are operated from a single handle 17, attached to a spindle 18, passing through an ordinary stuffing box 19, and carrying on its inner end a cam or eccentric 20. This element 20 bears upon a cross piece 21, rigidly secured to the valves 15 and 16, so that movement of the handle 17 in one direction will cause the valves to move away from their seats, while movement in the other direction will cause the valves to move toward their seats. A spring 22, having one end suitably mounted on the body of the casing and the other bearing against the under side of the connecting bar 21, keeps the bar always resting solidly against the cam or eccentric 20, thus preventing chatter or any movement of the valves independent of the operating devices, these valves may be opened more or less as determined by the user so as to control the flow of water through the casing.

The valves for controlling the inlet ports are of the balanced piston type. There are really two valves, one 32 for controlling the flow of hot water to the chamber, and another 33 for controlling the flow of cold water thereto. A bar 31 connects the valves.

It is this valve structure, made up of the bar 31 and the piston valves 32 and 33 that is shifted by the thermostat under variations of temperature as water passes through the valve.

In order to balance the pressure on the two sides of the piston valves 32 and 33, the chamber 30 is provided with a channel 36 leading therefrom to the rear of the valve 32; and a similar channel 37 leading to the rear of the piston 33. These valves as a whole move in a passage 38 which is carefully reamed to size so that the valves move with a close fit. The ends of the channel are closed by plugs 39 one at either end thereof. But the exact manner in which this channel is formed and closed is not of the essence of the invention, and other arrangements may be used.

Positioned in the channel 38 is a helical spring 40, one end of which bears against the piston valve 33 and the other against the end of the plug 39. This spring tends to move the valve structure to the right (Fig. 1) in opposition to the thermostat which tends to move it in the opposite direction.

The valves 32 and 33 are operated directly by a lever 50 mounted upon a shaft or stud 51, the lever having a long end 52 which passes through an opening 53 in the part 31 of the valve structure and a shorter end 54 in position to be actuated directly by the thermostat, as will presently be described. The shaft or stud 51 may be secured in the casing in any preferred manner, but as here illustrated one end thereof rests in a socket 55 formed in the casing 30. While the other end is supported for rotation in a screw plug 56 provided with a companion socket 57 (Fig. 2).

The thermostat proper is mounted in the upper part of the casing 30, and may even project into the pipe beyond the casing. This thermostat may vary much in construction, but as here illustrated consists of a tube 60 and a bar 61 within the tube. These parts must have different coefficients of thermal expansion. These are secured together at the upper end by any suitable means as by screwing the rod through a block 62 secured in the top of the tube, and holding the same in position by a lock nut 63.

The tube 60 is guided in the upper part of the casing 30 by means of collars 64, which collars may be secured either to the casing or to the tube; and the tube at its lower end carries another collar 65 rigidly secured thereto.

The lower end of the rod 61 passes through a guide 69 secured in the lower end of the tube 60, and rests upon the short arm 54 of the lever 50; and the collar 65 fastened to the tube 60 projects beneath a cam or eccentric 66 mounted on the end of a shaft 67 which passes through an ordinary stuffing box and carries a handle 69 on its outer end.

As thus mounted, the thermostat is secured between the arm 54 of the lever 50 and the cam or eccentric 66 on the shaft 67. And since the spring 40 tends to press the piston valves and the lever 50 to the right (Fig. 1) this pressure is transmitted to the lower end of the rod 61, and the rod, being attached at its upper end to the tube 60, tends to lift the tube. However, the collar 65 secured to the tube lies beneath the cam or eccentric 66 on the shaft 67, and is under the control of this cam. The thermostat thus lies between the spring 40 on the one side, and the eccentric 66 on the other, the tension of the spring keeping the thermostat securely between the arm 54 of the lever 50 and the cam or eccentric 66 of the shaft 67.

The temperature of the water can be predetermined to a large extent by positioning the handle 69 in accordance with the index carried by the casing.

Any suitable means, such as an ordinary plumbers union 70, may be used to connect the casing 30 with the outlet pipe 71, so as to lead the water to the place desired.

As here illustrated, the collars 64 are provided with openings 75 through which water flows around the outside of the tube 60. And the tube is provided at the bottom with orifices 76, and at the top with orifices 77, so that the water may flow into and out of the tube, and around and in contact with the rod 61, thus bringing the water into contact with all elements of the thermostat.

The thermostat proper may be made in various combinations of materials; but as here illustrated the tube 60 has a coefficient of expansion which is small with relation to that of rod 61. Thus the tube may be made of iron or some suitable alloy having a low coefficient of expansion, while the rod 61 may be made of brass, bakelite, hard rubber, or some similar material having a relatively high coefficient of expansion.

With this arrangement the rod 61 is the effective expansible element, the tube 60 merely supporting the upper end of the rod, and serving as a means for holding the thermostat against the eccentric 66 under the tension of spring 40.

Bakelite or hard rubber as the expansible element is here suggested because of its high coefficient of expansion; other materials may be used, it being only essential that there shall be a sufficient difference between the coefficients of the two elements that expansion of one of them with respect to the other will be sufficient to operate the lever or levers which operate the piston valves. If the difference in the coefficients of the two elements be relatively high, a single lever 50 will suffice to secure the necessary movement of the piston valves; but if other combinations having a relatively small difference in their coefficients of expansion be used, it may be necessary to change the proportion of the lever arms 52 and 54; or possibly in some cases to use a combination of multiplying levers to secure the desired movement.

The operation is as follows:

The eccentricity or throws of cams 66, which is adjusted by the handle 69, is sufficient to move the valves 32 and 33 from the position shown in Fig. 1, where the hot water port 34 is completely open and the cold water port 35 is entirely closed, to the other extreme position where the cold water port 35 will be entirely open and the hot water port entirely closed.

As shown in Figs. 1 and 2, the handle 69 is in its highest position, and the low part of the cam 66 is in engagement with the collar 65. Under these conditions the spring 40 will have forced the valves 32 and 33 as far to the right as they can be forced, and the lever 50 will have raised the thermostat to its highest position, thus maintaining the collar 65 in contact with the cam 66. This is the position in which the hot water port 34 is entirely open and the cold water port 35 is entirely closed. If with the parts in this position the handle 17 is turned to open the valves 15 and 16, water will pass through the structure only from the hot water supply, because the valve 33 will have completely closed the port 35. As this hot water passes through the valve, it will come in contact with the thermostatic elements 60 and 61, causing the rod 61 to expand and the lower end thereof to move down, and shift the lever 50 and the valves 32 and 33 to the left. This shifting of the valves will continue until the theromstat shall have moved the valve 32 to partly close the port 34, and will have moved the valve 33 until it shall have partly opened the cold water port 35. Water will then continue to flow at or about the temperature determined by the thermostat with this particular adjustment of the parts.

If water at a lower temperature is desired, the handle 69 will be shifted one way or the other from the vertical, thus rotating the cam 66 and lowering the thermostat, thereby causing the lever 50 to move the valves 32 and 33 to the left until these valves shall have assumed some intermediate position. And the construction is such that when the handle 69 shall have been moved to a position approximately horizontal, the valve 32 will have assumed a position to about half close the hot water port 34, and the valve 33 will have moved to a position at which the cold water port 35 is about half closed. Now assuming the handle 17 to have been operated to open the valves 15 and 16, water will flow from both the hot water supply and the cold water supply, mix in the chamber 30, and pass out around the thermostat and on to the place of use. Variations in the temperature of the flowing water will slightly change the length of the thermostat, and this change will cause the valves 32 and 33 to move slightly from the position before described, thus varying the amount of hot and cold water, as may be required by this particular adjustment.

If the operating handle 69 shall have been moved so that it shall point in a downward direction, then the cam 66 shall have moved the thermostat down the maximum distance that it can be moved, and the valves 32 and 33 will be moved to the left until they shall have assumed a position with respect to the ports 34 and 35 about the same as shown in Fig. 1 except that the valves will be positioned to the left instead of to the right, and the port 34 will be entirely closed and the port 35 will be entirely open. Under these conditions only cold water will flow through the valve. As this water comes in contact with the thermostat it will vary the length thereof and partially open the hot water port 34 and partly close the cold water port 35. This will continue until the water shall have reached the temperature for which the apparatus is designed when the handle 69 is in the lowest position.

With this arrangement therefore it is possible to so control the water coming from hot and cold sources as to mix the same so as to secure a resulting flow of the desired temperature. And by shifting the handle 69 the temperature of this water can be varied at the will of the user, and when once set, the water will continue to flow at about the temperature determined by the position of the handle until the handle 69 is again changed, or the flow of water is stopped.

It will be apparent to those skilled in the art that various changes may be made in the details of the structure without departing from the spirit or scope of my invention.

What I claim is:

1. In a thermostatic mixing valve, the combination of a valve casing having inlet ports for hot and cold water and a discharge channel, balanced valves for controlling the ports, a bell-crank lever having a short and a long arm mounted in the casing for moving the valves, a thermostat in the discharge channel for engaging the short arm of the lever, a spring for moving the valves in opposition to the lever and thermostat, and manually operable means for shifting the thermostat and thereby the lever and valves so that the thermostat may control the movement of the valves under varying conditions of temperature as determined by the manual adjusting means.

2. In a thermostatic mixing valve, the combination of a valve casing having inlet ports one at each side thereof for hot and cold water and a discharge channel in line with the casing, valves for controlling the ports both mounted on one valve stem, a thermostat comprising concentric members in the discharge channel, means whereby movement of the thermostat due to changes in temperature may be communicated to the valve stem and valves, a spring for moving the valves in opposition to the thermostat, an eccentric co-operating with the outer member of the thermostat to shift the same, and means for rotating the eccentric whereby the thermostat and valves may be shifted manually at the will of the operator to vary the temperature at which the thermostat shall maintain the water.

ALBERT S. WALKER.